UNITED STATES PATENT OFFICE.

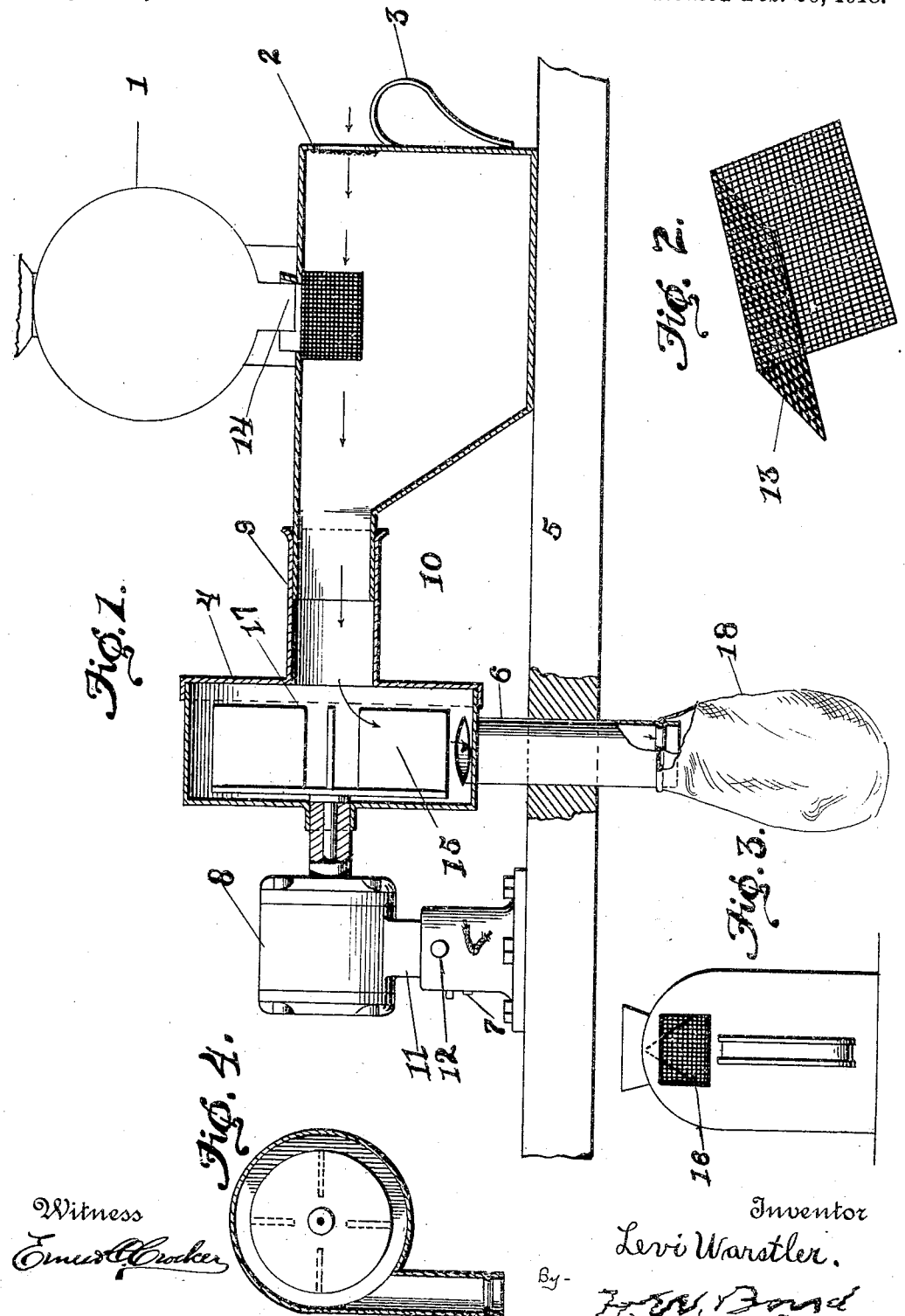

LEVI WARSTLER, OF LOUISVILLE, OHIO.

MEANS FOR EXTRACTING CHAFF FROM GROUND COFFEE.

1,257,429. Specification of Letters Patent. Patented Feb. 26, 1918.

Application filed March 10, 1917. Serial No. 154,018.

*To all whom it may concern:*

Be it known that I, LEVI WARSTLER, a citizen of the United States, residing at Louisville, in the county of Stark and State of Ohio, have invented a new and useful Means for Extracting Chaff from Ground Coffee, of which the following is a specification.

My invention relates to improvement in means for extracting chaff from ground coffee or more specifically the substance known as tannin, but in extracting the tannin, chaff and other light substances such as dirt and dust will be extracted.

The objects of the present invention are, first to provide a simple and cheap device for the purpose intended, which can be readily attached to the coffee mill proper regardless of any specific construction of the coffee mill; and second, to provide means for separating the particles of ground coffee as they pass from the grinding burs into the receptacle.

These objects, together with other objects readily apparent to those skilled in the art, may be attained by the construction illustrated in the accompanying drawings, although the invention may be embodied in other forms, the construction illustrated being chosen by way of example.

In the accompanying drawings:

Figure 1 is a side elevation of the fan motor, a vertical section of the fan chamber, the receptacle, also showing the chaff or tannin sack properly connected and conventionally showing a coffee mill in proper relationship with the parts above mentioned.

Fig. 2 is a detached view of the spreader.

Fig. 3 is an end view of the receptacle and

Fig. 4 is a side view of the fan and delivery spout.

Similar numerals of reference indicate corresponding parts throughout the several figures of the drawings.

In the accompanying drawing, 1 represents in a conventional manner a coffee mill which may be of any well known construction, but in the present instance the mill should be a power driven one, preferably of the type known as electric mills. Below the mill 1 is located the receptacle 2, which in this instance is an ordinary drawer and should be provided with the handle 3 for the purpose of convenience of removing and inserting the drawer in position. The fan chamber 4 is of the usual construction such as commonly used in connection with suction fans, which casing and fan are supported upon the base 5 or its equivalent by means of the delivery tube 6 or its equivalent. It will be understood that it is immaterial as to the kind of support employed to hold the fan and its casing in proper position. Upon the base 5 or its equivalent is located the motor base 7, to which motor base is attached the motor 8, the fan casing 4 is provided with the sleeve or extended collar 9, into which sleeve is inserted the delivery spout 10 located upon the receptacle 2.

The purpose of providing the sleeve 9 and the extension 10 is to produce a better suction or a movement of air through the receptacle 2 by telescopically connecting the parts 9 and 10 together and for the purpose of providing means for adjusting the height of the motor 8 and the fan casing 4 so that various sized receptacles 2 can be employed and properly connected, the motor should be adjustably mounted upon the base 7, which is accomplished by inserting the shank 11 into the base 7 and holding the same in fixed adjustment by a suitable set screw 12 or its equivalent.

For the purpose of spreading the ground coffee during the time it is passing by gravity from the mill proper into the receptacle 2, a spreader plate 13 is employed, which spreader plate is preferably V-shaped, the apex being located directly under the coffee mill delivery spout 14, and for the purpose of preventing the entire separation of the stream of ground coffee into separate and distinct divisions the spreader plate 13 should be perforated, thereby allowing at least the finer particles to pass through the perforations and to be acted upon by the movement of the air caused by the suction fan 15. In order to allow a current of air to pass into the receptacle to take the place of the quantity of air withdrawn by the suction fan the receptacle 2 should be provided with a perforated opening 16, which opening should be in substantial alinement with the eye 17 of the suction fan.

It is well understood that a small percentage of coffee is composed of what is chemically known as tannin, which when allowed to remain in the ground coffee produces an acid which is unpleasant to taste and more or less injurious and the prime object of the present invention is to remove while the coffee is being ground this tannin and other light substances, such as chaff and dust.

In the operation of my invention the suction fan 15 is put into action during the time the grinding mill or coffee mill proper is in action and I prefer to use a separate motor for the suction fan, but the motor which actuates the coffee mill and the motor which actuates the fan may be on the same circuit so that both motors will cut in and out simultaneously, but this is not absolutely necessary. It will be understood that a very small motor is all that is necessary to actuate the suction fan. While both motors are in action and during the grinding process the tannin and other material designed to be removed from the coffee is drawn into the fan chamber 4 and deposited in the removable sack 18, which sack is connected to the spout or tube 6 in any convenient and well known manner, but should be so connected that it can be easily attached and detached for the purpose of removing the contents from the sack from time to time.

I claim:

1. In a device of the character described, the combination of a suction fan, a coffee mill, said coffee mill located at one side of the suction fan, a receptacle located below said coffee mill, the chamber of said receptacle communicating with the casing of the suction fan, said receptacle provided with a spreader plate located below the delivery spout of the coffee mill and an air intake located through said receptacle and in alinement with the eye of the suction fan.

2. In a device of the character described, the combination of a suction fan, a coffee mill, said coffee mill located at one side of the suction fan, a receptacle located below said coffee mill, the chamber of said receptacle communicating with the casing of the suction fan, said receptacle provided with a spreader plate located below the delivery spout of the coffee mill, an air intake located through said receptacle and in alinement with the eye of the suction fan, and a removable sack connected to the fan chamber.

3. In a device of the character described, the combination of a coffee mill and a suction fan, a receptacle provided with an opening at its top, a perforated V-shaped spreader plate located directly below said opening and the coffee mill, said suction fan adapted to be operatively connected with the receptacle and a receiving sack located adjacent the suction fan casing and an air intake located through the receptacle, said spreader plate located between the eye of the suction fan and the receptacle air intake.

In testimony that I claim the above, I have hereunto subscribed my name.

LEVI WARSTLER.

Copies of this patent may be obtained for five cents each, by addressing the "Commissioner of Patents, Washington, D. C."